US012673456B2

(12) United States Patent
Nakagawa et al.

(10) Patent No.: US 12,673,456 B2
(45) Date of Patent: Jul. 7, 2026

(54) METHOD FOR PRODUCING RESIN CONTAINER AND TEMPERATURE CONTROL DEVICE

(71) Applicant: NISSEI ASB MACHINE CO., LTD., Nagano (JP)

(72) Inventors: Takeshi Nakagawa, Nagano (JP); Naoyuki Takada, Nagano (JP); Ryo Kawamura, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 208 days.

(21) Appl. No.: 18/575,978

(22) PCT Filed: Jul. 6, 2022

(86) PCT No.: PCT/JP2022/026853
§ 371 (c)(1),
(2) Date: Apr. 2, 2024

(87) PCT Pub. No.: WO2023/282292
PCT Pub. Date: Jan. 12, 2023

(65) Prior Publication Data
US 2024/0335998 A1      Oct. 10, 2024

(30) Foreign Application Priority Data
Jul. 7, 2021    (JP) ................................. 2021-112869

(51) Int. Cl.
*B29C 49/06*         (2006.01)
*B29C 49/64*         (2006.01)
*B29L 31/00*         (2006.01)
(52) U.S. Cl.
CPC ........ *B29C 49/064* (2013.01); *B29C 49/6435* (2022.05); *B29C 49/6458* (2022.05);
(Continued)

(58) Field of Classification Search
CPC .............. B29C 49/6458; B29C 45/261; B29C 45/0055; B29C 49/064; B29C 49/648;
(Continued)

(56) References Cited

U.S. PATENT DOCUMENTS

2022/0097286 A1      3/2022   Tsuchiya et al.

FOREIGN PATENT DOCUMENTS

DE      10 2008 041575 A1      3/2010
EP         3 369 552 B1      3/2021
(Continued)

OTHER PUBLICATIONS

Extended European Search Report in European family member application No. 22837706.5 dated Apr. 22, 2025.
(Continued)

*Primary Examiner* — Monica A Huson
(74) *Attorney, Agent, or Firm* — GREENBLUM & BERNSTEIN, P.L.C.

(57)          ABSTRACT

A method for manufacturing a resin container includes a first step of accommodating an injection-molded bottomed resin preform in a temperature-adjusted mold and adjusting a temperature of the preform by the mold, a second step of moving the mold by a predetermined amount in an axial direction with respect to the preform by a lifting and lowering device and then stopping the mold, and causing an air ejection part arranged on an upper surface side of the mold to face a portion of the preform to be cooled, a third step of ejecting air from the air ejection part to locally cool the portion to be cooled of the preform positioned in the axial direction, and a blow molding step of blow molding the preform whose temperature has been adjusted through the first to third steps and manufacturing a resin container.

6 Claims, 6 Drawing Sheets

(52) U.S. Cl.
CPC .... B29C 49/648 (2022.05); *B29C 2949/0715*
*(2022.05); B29L 2031/7158* (2013.01)
(58) Field of Classification Search
CPC . B29C 49/6435; B29C 49/681; B29C 49/062;
B29C 2949/0715; B29C 2949/3032;
B29C 2049/023; B29L 2031/7158
See application file for complete search history.

(56) References Cited

FOREIGN PATENT DOCUMENTS

| | | | |
|----|-------------|----|---------|
| JP | 61-89014 | A  | 5/1986  |
| JP | 6-170923 | A  | 6/1994  |
| JP | 2000-33644 | A  | 2/2000  |
| JP | 3340183 | B2 | 11/2002 |
| JP | 3893067 | B2 | 3/2007  |
| JP | 2021-54068 | A  | 4/2021  |

OTHER PUBLICATIONS

International Search Report dated Sep. 20, 2022 in International
Bureau of WIPO Patent Application No. PCT/JP2022/026853 with
an English translation thereof.
Written Opinion dated Sep. 20, 2022 in International Bureau of
WIPO Patent Application No. PCT/JP2022/026853 with an English
translation thereof.

FIG. 1

METHOD FOR PRODUCING RESIN CONTAINER AND TEMPERATURE CONTROL DEVICE

BACKGROUND OF THE INVENTION

Field of the Invention

The present invention relates to a method for manufacturing a resin container and a temperature adjusting device.

Description of the Related Art

Conventionally, a hot parison type blow molding apparatus has been known as one of apparatuses for manufacturing a resin container. The hot parison type blow molding apparatus is configured to blow-mold a resin container using residual heat from injection molding of a preform, and is advantageous in that it is possible to manufacture a resin container which is diversified and excellent in aesthetic appearance as compared with a cold parison type.

In addition, when a container having a special shape, such as a stackable container or a container with a handle, is manufactured, there is a demand for forming a specific portion of the container thick in order to secure rigidity of the container. When manufacturing this type of container, it is necessary to locally cool a portion corresponding to a thick portion of the container in the preform.

For example, JP 3893067 B2 discloses a configuration in which, in formation of a container having a triangular cross section, a cooling air nozzle is provided at an upper end of a temperature adjusting pot for preliminary blowing a preform, and air is blown to a portion corresponding to a corner portion of the container in the preform after the preliminary blowing to cool the portion. The blowing of air in JP 3893067 B2 is controlled by a timer so as to be performed in accordance with a timing at which the preform passes through the temperature adjusting pot when the preform is taken out.

JP 3893067 B2 discloses a technique in which a cooling means for locally cooling a desired position of a preform is provided in a temperature adjusting pot, and the preform is locally cooled while the temperature adjusting pot moves downward at a predetermined speed. In JP 3893067 B2, the timing of blowing air as a cooling means is controlled by a timer, but if specifications such as the shape and size of the preform and conditions such as a moving speed of the preform are different, the cooling portion varies greatly even when the time of the timer is set to be the same. Therefore, in the technique of JP 3893067 B2, adjustment of parameters for appropriately blowing air is very complicated. For example, in a case where a desired position in an axial direction of the preform is locally cooled to a pinpoint, it is very difficult to intuitively set the timing of appropriately blowing air with the timer. In addition, in the case of manufacturing various types of containers, it is necessary to set optimal parameters for each container, and thus, the work load in maintenance also increases. Furthermore, the position of a cooling unit is fixed for each mold. Therefore, in the above case, a plurality of mold parts (position adjusting parts) is required to adjust the position of the cooling unit of the preform, and the manufacturing cost of the container becomes very high.

On the other hand, as disclosed in JP 3340183 B2, a cooling device (accessory device) for locally cooling a desired position of a preform may be separately provided in a blow molding apparatus. However, since the cooling device is not inexpensive, the manufacturing cost of the container increases. Moreover, in order not to extend the molding cycle, the cooling device needs to be provided in a temperature adjusting unit of the blow molding apparatus, but the temperature adjusting unit may also need to be provided with another mechanism (for example, a gate cutting device) in addition to a temperature adjusting pot. In the above case, local cooling itself of the desired position of the preform by the temperature adjusting unit may be difficult because an arrangement space for the cooling device is limited and a portion where the preform can be cooled is limited.

SUMMARY OF THE INVENTION

A method for manufacturing a resin container according to an aspect of the present invention includes a first step of accommodating an injection-molded bottomed resin preform in a temperature-adjusted mold and adjusting a temperature of the preform by the mold, a second step of moving the mold by a predetermined amount in an axial direction with respect to the preform by a lifting and lowering device and then stopping the mold, and causing an air ejection part arranged on an upper surface side of the mold to face a portion of the preform to be cooled, a third step of ejecting air from the air ejection part to locally cool the portion to be cooled of the preform positioned in the axial direction, and a blow molding step of blow molding the preform whose temperature has been adjusted through the first to third steps and manufacturing a resin container.

Further features of the present invention will become apparent from the following description of exemplary embodiments with reference to the attached drawings.

BRIEF DESCRIPTION OF THE DRAWINGS

FIG. 1 is a perspective view of a container of the present embodiment.

DESCRIPTION OF THE EMBODIMENTS

Figure 2:
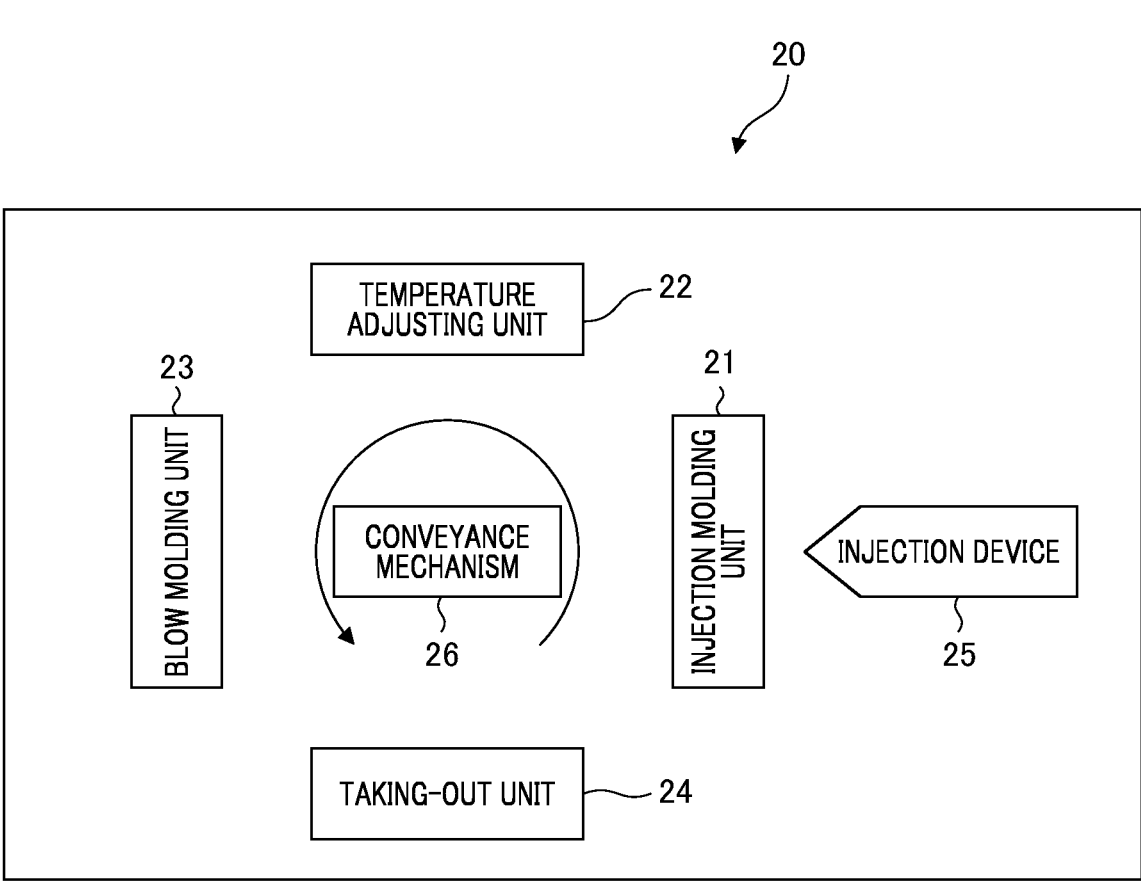
FIG. 2 is a diagram schematically illustrating a configuration of a blow molding apparatus according to the present embodiment.

Hereinafter, embodiments of the present invention will be described with reference to the drawings.

In the embodiment, for easy understanding, structures and elements other than a main part of the present invention will be described in a simplified or omitted manner. Further, in the drawings, the same elements are denoted by the same reference numerals. Note that the shapes, dimensions, and the like of elements illustrated in the drawings are schematically illustrated, and do not indicate actual shapes, dimensions, and the like.

(Description of Resin Container)

Figure 1:
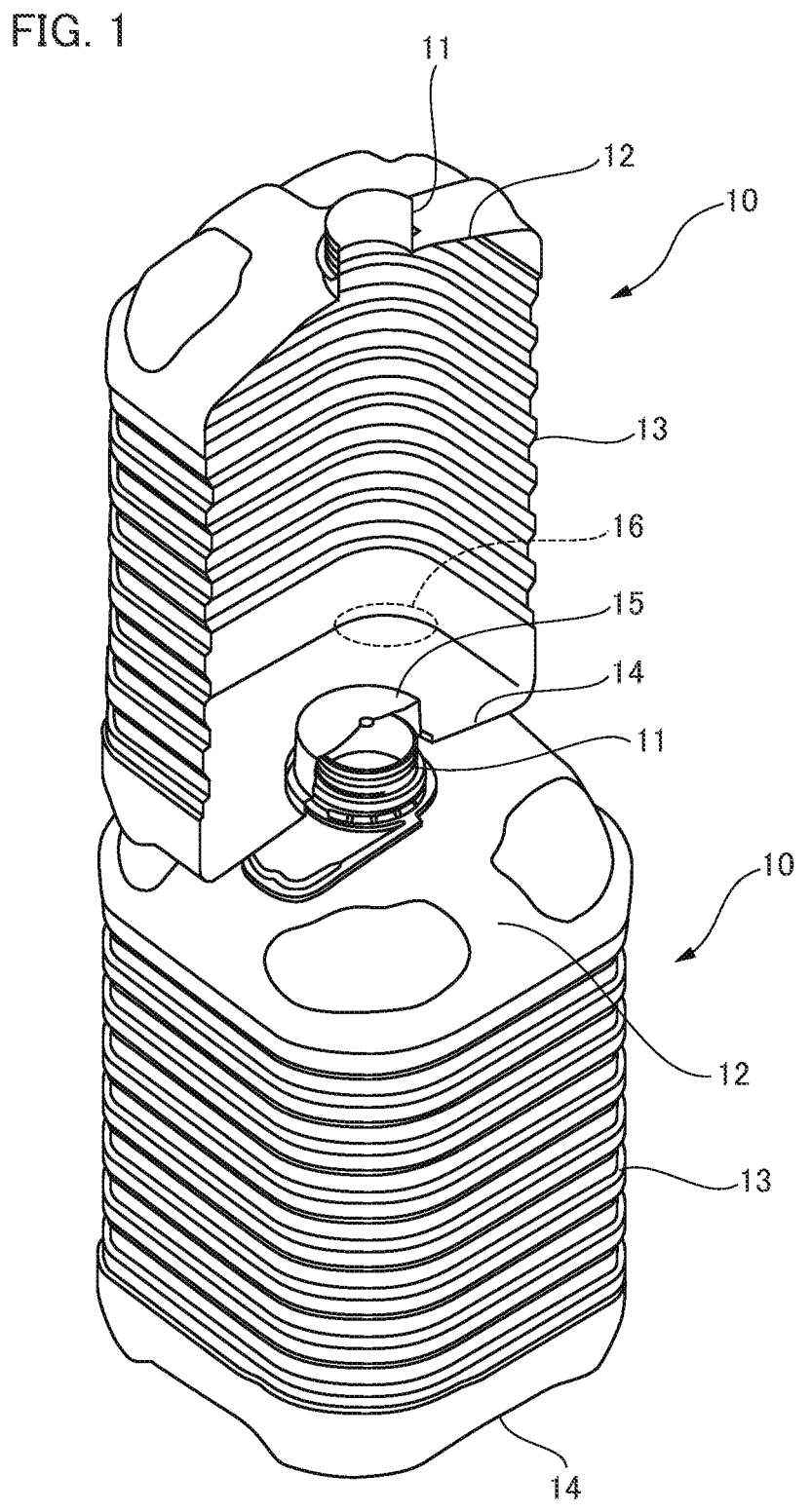

First, a configuration example of a resin container (hereinafter also simply referred to as a container) according to the present embodiment will be described with reference to FIG. 1. FIG. 1 is a perspective view of a container 10 of the present embodiment.

The container 10 illustrated in FIG. 1 is a stackable container having a large capacity (for example, a capacity of 15 L to 20 L) used for storing mineral water, edible oil, or the like, and is manufactured by blow molding a resin preform 40 described later. The entire shape of the container 10 illustrated in FIG. 1 is a prismatic shape with rounded corners, and the cross section thereof is substantially rectangular. The container 10 includes a neck portion 11 whose upper side is opened, a shoulder portion 12 connected to a lower side of the neck portion 11, a body portion 13 connected to a lower side of the shoulder portion 12, and a bottom portion 14 that closes a lower end of the body portion 13. The bottom portion 14 is formed with a recess 15 for receiving the neck portion 11 of the container 10 positioned on the lower side during stacking.

The container 10 can be stacked (stacked) in a self-supporting manner with a portion of the bottom portion 14 in contact with a portion of the shoulder portion 12 of another container 10. At this time, the neck portion 11 sealed with a cap (not illustrated) in the lower container 10 is accommodated in the recess 15 at the bottom portion 14 of the upper container 10. Thus, the storage space of the container 10 can be suppressed, and the stability of the container 10 at the time of stacking can be enhanced.

In the rectangular large-capacity container 10 as illustrated in FIG. 1, the container 10 tends to be thinned at a corner portion (heel portion 16) of the bottom portion 14 where a stretch ratio from the preform 40 is the maximum. When the heel portion 16 is thinned in the container 10 of this type, the container 10 cannot withstand the load and is deformed, and particularly, the posture at the time of stacking may become unstable. In order to suppress such an event, it is required to locally cool a corresponding portion of the heel portion 16 in the preform 40 before blow molding so that the heel portion 16 is less likely to stretch than other portions, and to make the heel portion thick.

(Description of Blow Molding Apparatus)

Next, a configuration of the blow molding apparatus of the present embodiment will be described. FIG. 2 is a diagram schematically illustrating a configuration of the blow molding apparatus 20 according to the present embodiment. The blow molding apparatus 20 of the present embodiment is a hot parison type (also referred to as a one-stage type) apparatus that blow-molds the container 10 by utilizing residual heat (internal heat quantity) from injection molding without cooling the preform 40 to room temperature.

The blow molding apparatus 20 includes an injection molding unit 21, a temperature adjusting unit 22, a blow molding unit 23, a taking-out unit 24, and a conveyance mechanism 26. The injection molding unit 21, the temperature adjusting unit 22, the blow molding unit 23, and the taking-out unit 24 are disposed at positions rotated by a predetermined angle (for example, 90 degrees) around the conveyance mechanism 26.

(Conveyance Mechanism 26)

The conveyance mechanism 26 includes a transfer plate (not illustrated in FIG. 2) that moves so as to rotate about an axis in a direction perpendicular to the paper surface of FIG. 2. On a transfer plate 28, one or more neck molds 27 (not illustrated in FIG. 1) for holding the neck portion of the preform 40 or the container 10 are arranged at each predetermined angle. The conveyance mechanism 26 moves the transfer plate 28 by 90 degrees to convey the preform 40 (or the container 10) having the neck portion held by the neck mold 27 in the order of the injection molding unit 21, the temperature adjusting unit 22, the blow molding unit 23, and the taking-out unit 24. Note that the conveyance mechanism 26 further includes a mold opening mechanism of the neck mold 27 and the like.

(Injection Molding Unit 21)

The injection molding unit 21 includes an injection cavity mold and an injection core mold (not illustrated), and manufactures the preform 40 illustrated in FIG. 3 to be described later. An injection device 25 that supplies a resin material, which is a raw material of the preform 40, is connected to the injection molding unit 21.

In the injection molding unit 21, the injection cavity mold, the injection core mold, and the neck mold 27 of the conveyance mechanism 26 are closed to form a preform-shaped mold space. Then, by pouring the resin material from the injection device 25 into the mold space having such a preform shape, the preform 40 is manufactured by the injection molding unit 21.

Here, the entire shape of the preform 40 is a bottomed cylindrical shape in which one end side is opened and the other end side is closed. The preform 40 includes a neck portion formed on one end side and having an opening, a body portion connected to the neck portion and formed in a cylindrical shape, and a bottom portion connected to the body portion and closing the other end side.

In addition, the materials of the container 10 and the preform 40 are thermoplastic synthetic resins, and can be appropriately selected according to the use of the container 10. Specific examples of the material include PET (polyethylene terephthalate), polyethylene naphthalate (PEN), poly-cyclohexanedimethylene terephthalate (PCTA), Tritan (Tritan (registered trademark): co-polyester manufactured by Eastman Chemical Company), polypropylene (PP), polyethylene (PE), polycarbonate (PC), polyethersulfone (PES), polyphenylsulfone (PPSU), polystyrene (PS), cyclic olefin polymer (COP/COC), polymethyl methacrylate acrylic (PMMA), polylactic acid (PLA), and the like.

Note that, even when molds of the injection molding unit 21 are opened, the neck mold 27 of the conveyance mechanism 26 is not released, and the preform 40 is held and conveyed as it is. The number (that is, the number of containers 10 that can be simultaneously molded by the blow molding apparatus 20) of the preforms 40 simultaneously molded by the injection molding unit 21 can be appropriately set.

(Temperature Adjusting Unit 22)

The temperature adjusting unit 22 has a function of cooling or heating the preform 40 in a high temperature state after injection molding in the mold to adjust the temperature, and equalizing or removing uneven temperature of the preform 40. In addition, the temperature adjusting unit 22 in the present embodiment has a function of locally cooling a desired portion of the preform 40 by blowing air to the preform 40 whose temperature has been adjusted by the mold.

Figure 3:
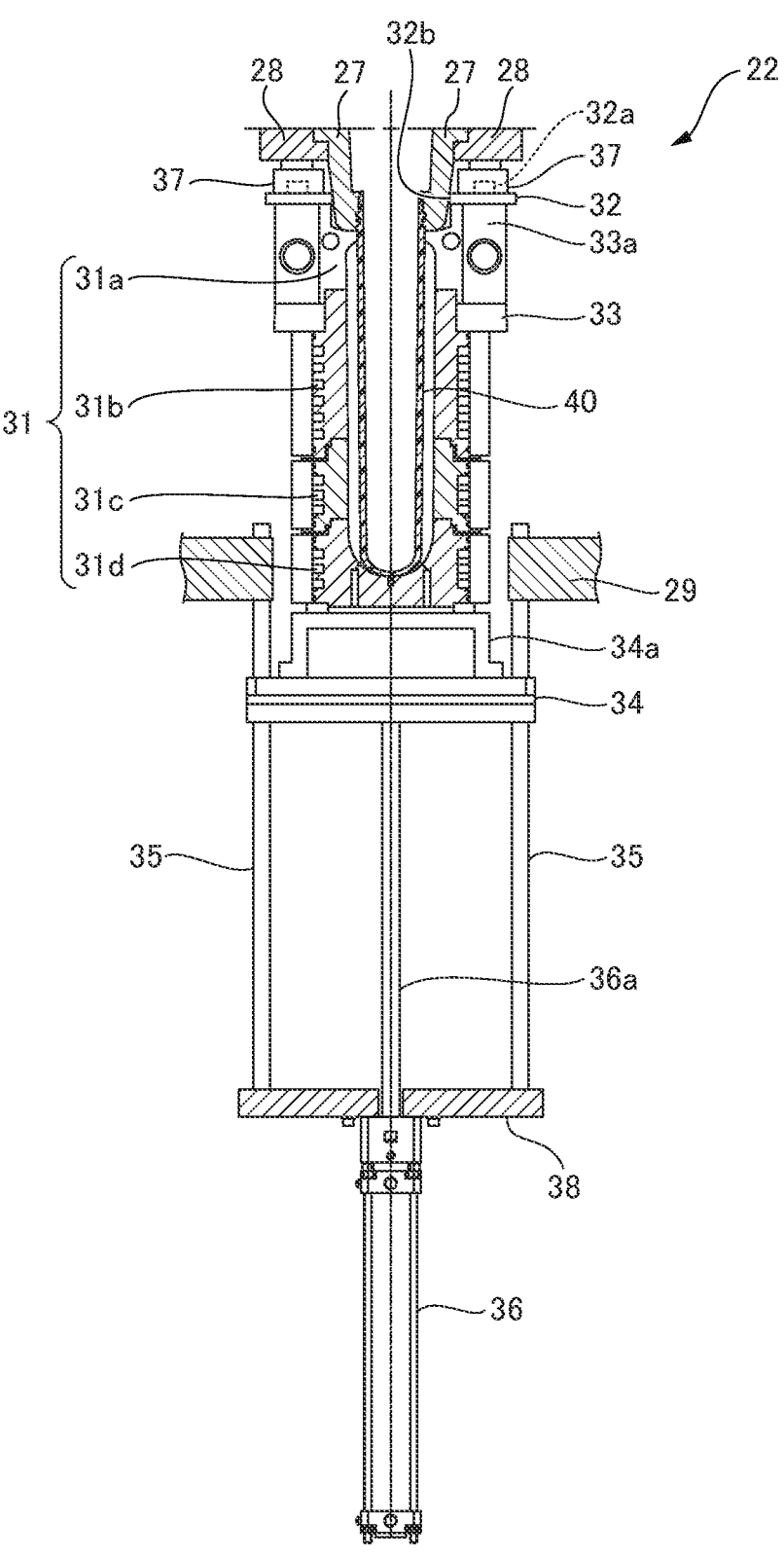
FIG. 3 is a longitudinal sectional view illustrating a configuration example of a temperature adjusting unit.

FIG. 3 is a vertical cross-sectional view illustrating a configuration example of the temperature adjusting unit 22. The temperature adjusting unit 22 illustrated in FIG. 3 is configured to preliminary blow the preform 40 manufactured by the injection molding unit 21 to mold a bottomed cylindrical intermediate molded body 41 having a body portion larger in diameter than the preform 40. Note that the intermediate molded body 41 is an example of the preform 40 when the preliminary blowing is performed.

The temperature adjusting unit 22 includes a cavity mold (temperature adjusting pot mold) 31 capable of accommodating the preform 40 manufactured by the injection molding unit 21, an upper support plate 32 as an example of a plate, a lower support plate 33, a movable table 34, a shaft (guide member) 35, a drive cylinder 36, an air ejection part 37, and a lower fixing plate 38.

The cavity mold 31 is a mold that is open on the upper surface side and has a mold space corresponding to the shape of the intermediate molded body 41 inside. The cavity mold 31 performs temperature equalization and temperature deviation removal of the intermediate molded body 41, and adjusts the temperature of the intermediate molded body 41 so as to have a temperature suitable for blow molding (for example, about 90° C. to 105° C.) and a temperature distribution suitable for a container shape to be shaped. Further, the temperature adjusting unit 22 also has a function of cooling the intermediate molded body 41 in a high temperature state.

The cavity mold 31 is configured to be capable of setting different temperatures in an axial direction of the preform. For example, the cavity mold 31 is divided into a plurality of two or more of at least an upper cavity mold and a lower cavity mold in the axial direction of the preform. The cavity mold 31 has a four-split type configuration as an example, and in FIG. 3, a first mold 31*a* as an upper cavity mold, a second mold 31*b*, a third mold 31*c*, and a fourth mold 31*d* as lower cavity molds are stacked in this order from the upper side in the drawing. The upper support plate 32 is disposed on an upper surface side of the first mold 31*a*, and the lower support plate 33 is disposed between a lower surface of an outer peripheral portion of the first mold 31*a* and an upper surface of an outer peripheral portion of the second mold 31*b*. More specifically, it is preferable that the lower support plate 33 abuts on a step portion formed on the outer peripheral portion of the second mold 31*b* and is disposed in a non-contact state with a lower end of the outer peripheral portion of the first mold 31*a*. Further, the upper support plate 32 is preferably disposed in a non-contact state with the upper surface of the first mold 31*a*. Furthermore, the fourth mold 31*d* is placed on an upper surface of the movable table 34 (or a spacer 34*a* described later). Note that a spacer 34*a* for adjusting the axial position of the cavity mold 31 is disposed between the cavity mold 31 and the movable table 34.

Then, the lower support plate 33 and the movable table 34 are connected and integrated by a plurality of support pillars (not illustrated) extending in the axial direction of the preform 40. In addition, the second mold 31*b* to the fourth mold 31*d* are connected and integrated, or are fixed to the movable table 34 by being sandwiched between the lower support plate 33 and the movable table 34. The lower support plate 33 includes two block-shaped members 33*a* at positions facing each other on the upper surface. The upper support plate 32 is fixed to an upper surface of the block-shaped member 33*a* by a connecting member 32*c* such as a bolt.

The first mold 31*a* faces an outer peripheral surface in the vicinity of a neck portion of the preform 40. The first mold 31*a* includes a pair of split molds, and can be opened and closed in a depth direction in the drawing by a drive mechanism (for example, an air cylinder) not illustrated. For example, the pair of first molds 31*a* is supported by a guide mechanism provided on the block-shaped member 33*a* so as to be movable in a horizontal direction between a mold closing position and a mold opening position. By opening and closing the first mold 31*a*, the intermediate molded body 41 after the preliminary blow can be taken out from the cavity mold 31.

Each of the second mold 31*b* and the third mold 31*c* faces the outer peripheral surface of the body portion of the preform 40. Further, the fourth mold 31*d* faces an outer peripheral surface of a bottom portion of the preform 40. A bottom surface of the second mold 31*b* and an upper surface of the third mold 31*c*, and a bottom surface of the third mold 31*c* and an upper surface of the fourth mold 31*d* are engaged by an inlay structure in a state where, for example, a heat insulating member is sandwiched between the molds.

Further, a flow path (not illustrated) through which a temperature control medium (refrigerant) flows is formed in each of the first mold 31*a* to the fourth mold 31*d* of the cavity mold 31. Thus, the temperature of the first mold 31*a* to the fourth mold 31*d* is maintained at a predetermined temperature by the temperature adjusting medium. Note that the temperature of the temperature regulating medium is not particularly limited, but can be appropriately selected within a range of, for example, 5° C. to 80° C., preferably 30° C. to 60° C. Note that the temperature distribution in the axial direction of the intermediate molded body 41 can also be changed by changing the temperatures of the first mold 31*a* to the fourth mold 31*d*.

In addition, the temperature adjusting unit 22 includes a core member (not illustrated) that supplies and discharges compressed air in the preform 1. The core member is inserted into the neck mold 27 and the preform 40 from above, and is airtightly abutted against the neck portion of the preform 40 in a state of being inserted into the neck mold 27. At the time of preliminary blowing, compressed air is introduced into the preform 40 from the core member, whereby the preform 40 swells so as to be in close contact with the cavity mold 31, and is shaped into the shape of the intermediate molded body 41.

The movable table 34, the shaft 35, the drive cylinder 36, and the lower fixing plate 38 are disposed below the machine bed 29 of the blow molding apparatus 20. Four shafts 35 are provided. In FIG. 3, only a pair of left and right shafts 35 is illustrated. These shafts 35 extend in parallel in a vertical direction and connect the machine bed 29 and the lower fixing plate 38.

Note that, in a case where the preform 40 is short or the rotary plate (transfer plate) supporting the neck mold 27 moves up and down, at least the movable table 34 may be arranged, for example, on an upper side of the machine bed 29 of the blow molding apparatus 20 at a standby position (lowest position). The shaft 35, the drive cylinder 36, and the lower fixing plate 38 may also be arranged on the upper side of the machine bed 29 as long as there is a margin in the space of the blow molding apparatus 20.

A movable table 34 disposed between the machine bed 29 and the lower fixing plate 38 is loosely fitted to each shaft 35. Thus, the movable table 34 can vertically translate along the shaft 35 below the machine bed 29.

The drive cylinder 36 is an example of a lifting and lowering device, and is constituted by, for example, an air cylinder, is attached upward to a lower side of the lower fixing plate 38, and moves a piston rod 36*a* connected to a lower side of the movable table 34 forward and backward. The drive cylinder 36 moves the movable table 34 in the vertical direction via the piston rod 36*a*. When the piston rod 36*a* extends with respect to the drive cylinder 36, the movable table 34 moves upward, and when the piston rod 36*a* contracts with respect to the drive cylinder 36, the movable table 34 moves downward. In addition, the lifting and lowering device may be configured using an electric motor (for example, a servomotor or the like).

Figure 4:
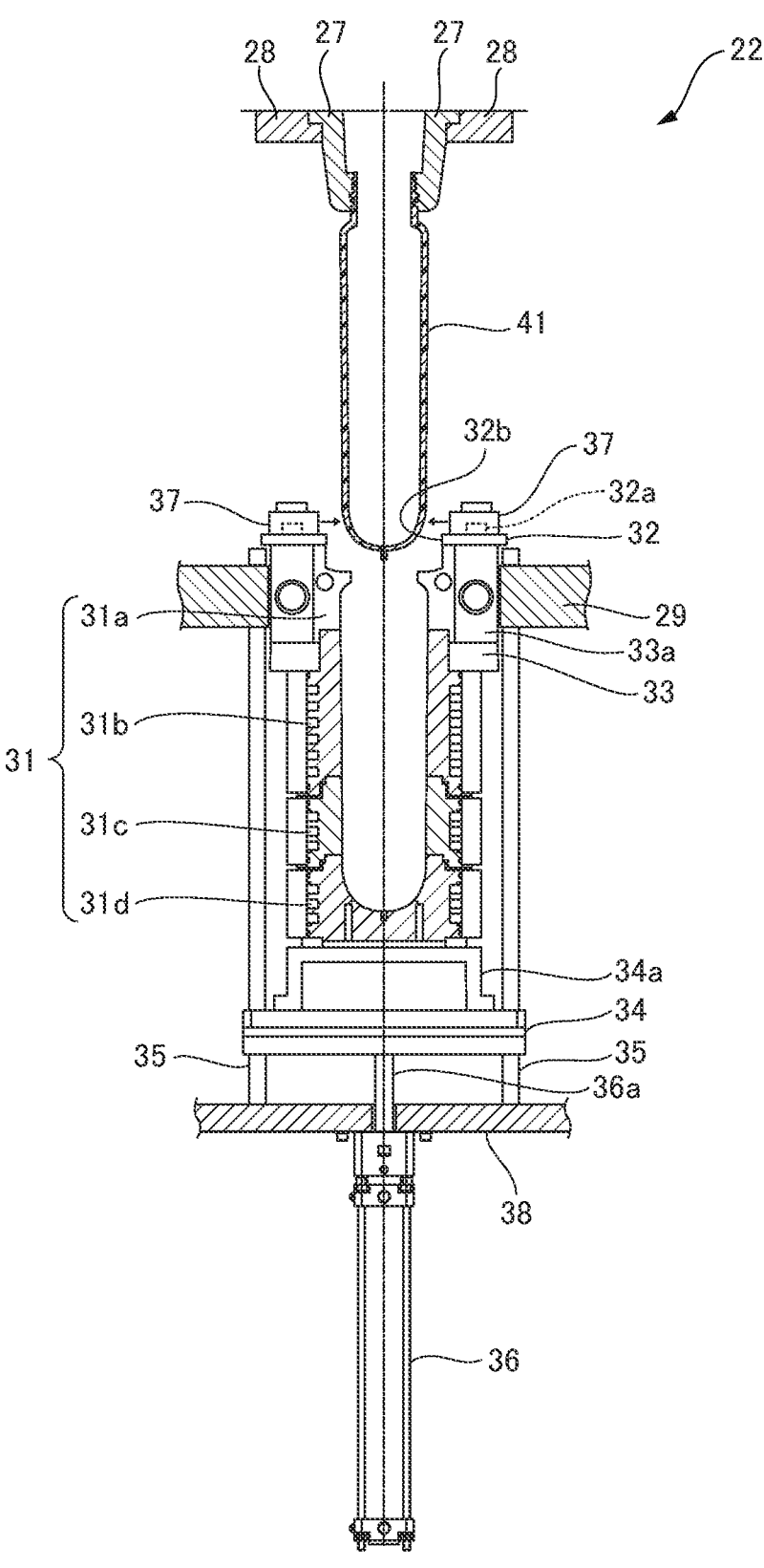
FIG. 4 is a view illustrating a state in which a cavity mold is lowered from the position of FIG. 3.

FIG. 4 illustrates a state in which the cavity mold 31 is lowered from a first position (upper end position, temperature adjusting position) of FIG. 3 to a second position (intermediate position, local cooling position) after temperature adjustment in the cavity mold 31. The drive cylinder 36 or the lifting and lowering device also has a function of adjusting the axial position of the air ejection part 37 with respect to the intermediate molded body 41 by vertically positioning and stopping the movable table 34. Specifically, the drive cylinder 36 or the lifting and lowering device is provided with a rod fixing mechanism (or a position fixing mechanism of the lifting and lowering device) that can fix the piston rod 36a at any lifting position and immobilize the piston rod. Note that, after the intermediate molded body 41 is locally cooled by the air ejection part 37 to be described later, the rod fixing mechanism (or the position fixing mechanism of the lifting device) is released, and the cavity mold 31 is lowered to a position (lower end position, standby position) at which it does not interfere with the intermediate molded body 41.

Figure 5:
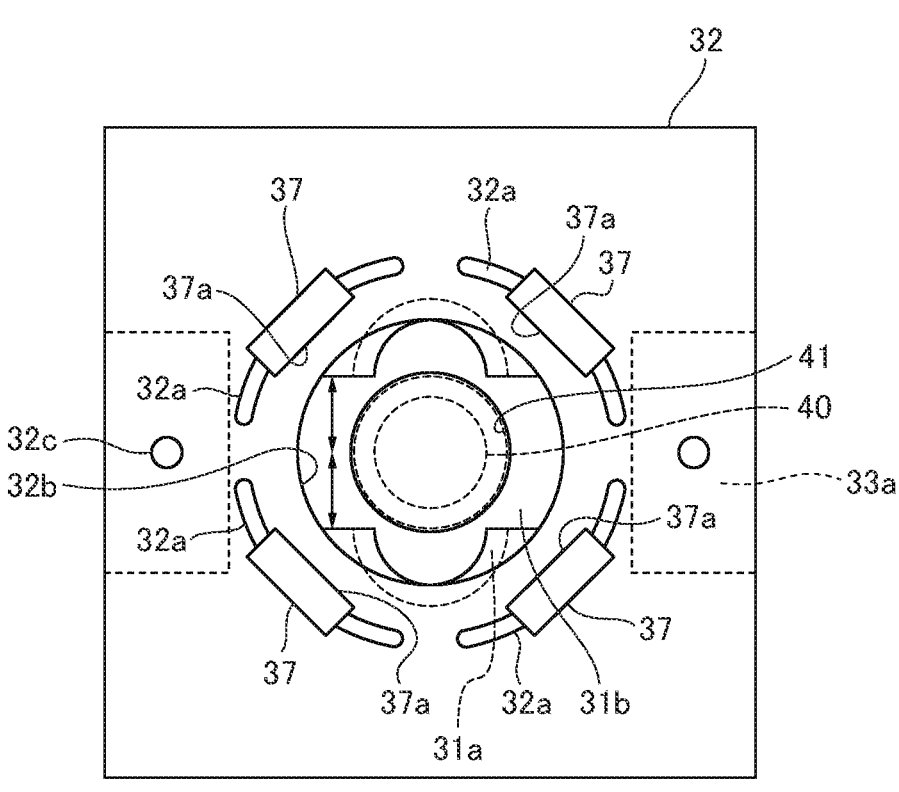
FIG. 5 is a view illustrating an arrangement example of an air ejection part of a temperature adjusting unit.

The air ejection part 37 is attached to the upper side of an upper support plate 32 and has a function of locally cooling the intermediate molded body 41 by ejection of air. As illustrated in FIG. 5, at least one air ejection part 37 is provided around an opening 32b of the upper support plate 32 (or the opening of the cavity mold 31), and for example, four air ejection parts are attached at intervals of 90 degrees. Each of the air ejection parts 37 is disposed inward such that a surface 37a provided with an air ejection part faces the opening 32b side. Further, air ejection ports of the plurality of (for example, four) air ejection parts 37 are arranged at positions corresponding to the heel portion 16 of the container 10 in a circumferential direction of the intermediate molded body 41. The opening 32b is a through hole through which the intermediate molded body 41 can move up and down without interference, and is formed in a circular shape in top view, for example. The air ejection part 37 is disposed outside the opening 32b.

Further, in the upper support plate 32, one or more arc-shaped grooves 32a are formed in an annular shape around the opening 32b, and for example, four grooves 32a are formed. The groove 32a formed in the upper support plate 32 extends along the circumference centered on the preform 40 (intermediate molded body 41) or the circumference centered on the opening 32b. Further, the air ejection part 37 is attached to the groove 32a and positioned. Then, the air ejection part 37 can adjust an attachment position in a circumferential direction with respect to the preform or the opening 32b along the groove 32a.

(Blow Molding Unit 23)

Returning to FIG. 2, the blow molding unit 23 performs stretch blow molding on the preform 40 (intermediate molded body 41) whose temperature has been adjusted by the temperature adjusting unit 22 to manufacture a container.

The blow molding unit 23 includes a blow cavity mold which is a pair of split molds corresponding to the shape of the container, a bottom mold, a stretching rod, and an air introduction member (blow core mold, none illustrated). The blow molding unit 23 blow-molds the intermediate molded body 41 while stretching the intermediate molded body. Thus, the intermediate molded body 41 is shaped into a blow cavity mold, and the container 10 can be manufactured.

(Taking-Out Unit 24)

The taking-out unit 24 is configured to release the neck portion 11 of the container 10 manufactured by the blow molding unit 23 from the neck mold 27 and take out the container 10 to the outside of the blow molding apparatus 20.

(Description of Blow Molding Method)

Figure 6:
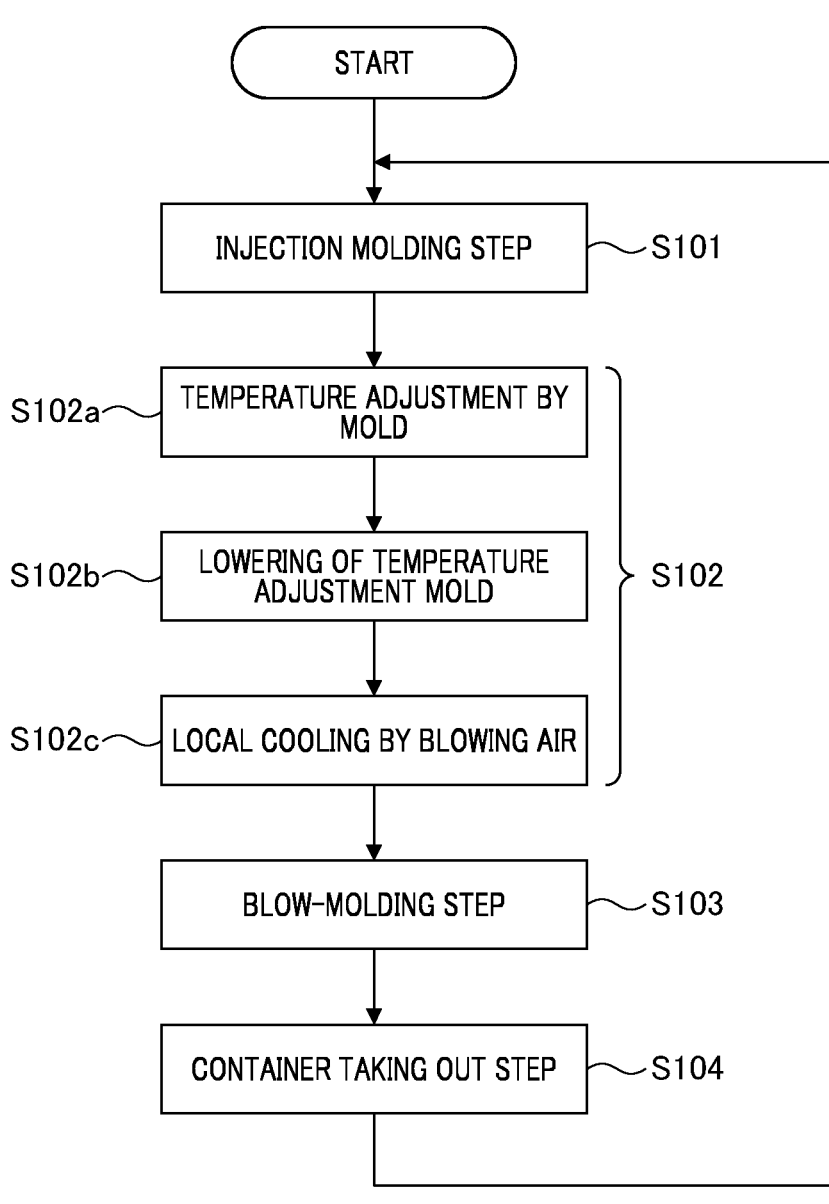
FIG. 6 is a flowchart illustrating steps of a blow molding method.

Next, a blow molding method by the blow molding apparatus of the present embodiment will be described. FIG. 6 is a flowchart illustrating steps of the blow molding method.

(Step S101: Injection Molding Step)

In step S101, in the injection molding unit 21, the resin is injected from the injection device 25 into the preform-shaped mold space formed by the injection cavity mold, the injection core mold, and the neck mold 27 of the conveyance mechanism 26 to manufacture the preform 40.

In step S101, when the injection molding of the preform 40 is completed, the molds of injection molding unit 21 are opened, and the preform 40 is released from the injection cavity mold and the injection core mold. Next, the transfer plate 28 of the conveyance mechanism 26 moves so as to rotate by a predetermined angle, and the preform 40 held by the neck mold 27 is conveyed to the temperature adjusting unit 22.

(Step S102: Temperature Adjusting Step)

Subsequently, the temperature adjusting unit 22 performs temperature adjustment for bringing the temperature of the preform 40 close to a temperature suitable for the final blow. In the temperature adjusting unit 22 of the present embodiment, preliminary blowing of the preform 40 and temperature adjustment of the intermediate molded body 41 after the preliminary blowing are performed.

In the initial state of the temperature adjusting step, the cavity mold 31 is at a position (standby position) retracted downward with respect to the preform 40. First, the cavity mold 31 is raised to a predetermined position (temperature adjusting position) together with the movable table 34 by driving of the drive cylinder 36. Thus, as illustrated in FIG. 3, the preform 40 held by the neck mold 27 is accommodated in the cavity mold 31.

Then, the core member is inserted into the neck portion of the preform 40 accommodated in the cavity mold 31, and the neck portion of the preform 40 and the core member are brought into close contact with each other to maintain airtightness therebetween. Thereafter, the preform 40 is preliminary blown by introducing compressed air into the preform 40 from the core member (S102a: First step).

The preform 40 into which the compressed air has been introduced by the preliminary blowing has a body portion bulging so as to be in close contact with the mold space of the cavity mold 31, and is shaped into the shape of the intermediate molded body 41. The intermediate molded body 41 continues to be in contact with the cavity mold 31 kept at a predetermined temperature until being released. Therefore, in the temperature adjusting unit 22, the temperature of the intermediate molded body 41 is adjusted so as not to be equal to or lower than a temperature suitable for blow molding from the outside, and unevenness temperature generated from injection molding is also reduced (S102a).

When the preliminary blowing and the temperature adjustment in the cavity mold 31 are completed, the core member rises and retracts, and the first mold 31a slides to be released from the intermediate molded body 41. Thus, the cavity mold 31 can move downward without interfering with a shoulder portion of the intermediate molded body 41. Thereafter, the cavity mold 31 is lowered by a predetermined height together with the movable table 34 by driving of the drive cylinder 36 and stops at a predetermined position (local cooling position) (S102b: Second step). Thus, as illustrated in FIG. 4, the air ejection part 37 faces the vicinity of a bottom portion of the intermediate molded body 41. At this time, the rod fixing mechanism (or the position fixing mechanism of the lifting and lowering device) operates to thereby fix the movable table 34, the cavity mold 31, or the upper support plate 32 in a positionally fixed manner.

Then, as illustrated in FIG. 4, air is injected from the air ejection part 37 toward the intermediate molded body 41. Thus, a desired position such as the vicinity of the bottom portion of the intermediate molded body 41 is locally cooled by blowing air (S102*c*: Third step). Note that the portion of the intermediate molded body 41 cooled by the air ejection part 37 corresponds to, for example, the heel portion 16 of the container 10.

After the intermediate molded body 41 is locally cooled, the position fixation by the rod fixing mechanism (or the position fixing mechanism of the lifting and lowering device) is released, and the cavity mold 31 is further lowered and retracted to the initial position (standby position) by driving of the drive cylinder 36. Thereafter, the transfer plate 28 of the conveyance mechanism 26 moves so as to rotate by a predetermined angle, and the intermediate molded body 41 after temperature adjustment held by the neck mold 27 is conveyed to the blow molding unit 23.

(Step S103: Blow Molding Step)

Subsequently, in the blow molding unit 23, the container 10 is blow-molded.

First, the blow cavity mold is closed, the intermediate molded body 41 is accommodated in the mold space, and the air introduction member (blow core) is lowered, so that the air introduction member abuts on the neck portion of the intermediate molded body 41. Then, the stretching rod (longitudinal axis stretching member) is lowered to hold the bottom portion of the intermediate molded body 41 from the inner surface, and blow air is supplied from the air introduction member while performing longitudinal axis stretching as necessary to laterally axially stretch the intermediate molded body 41. Thus, the intermediate molded body 41 is bulged and shaped so as to be in close contact with the mold space of the blow cavity mold, and is blow-molded into the container 10. Note that, before closing the blow cavity mold, the bottom mold stands by at a lower position not in contact with the bottom portion of the intermediate molded body 41, and quickly rises to the molding position before closing the mold or after closing the mold.

(Step S104: Container Taking Out Step)

When the blow molding is finished, the blow cavity mold and the bottom mold are opened. Thus, the container 10 is movable from the blow molding unit 23.

Subsequently, the transfer plate 28 of the conveyance mechanism 26 moves so as to rotate by a predetermined angle, and the container 10 is conveyed to the taking-out unit 24. In the taking-out unit 24, the neck portion 11 of the container 10 is released from the neck mold 27, and the container 10 is taken out to the outside of the blow molding apparatus 20.

This completes the series of steps of the blow molding cycle. Thereafter, by moving the transfer plate 28 of the conveyance mechanism 26 so as to rotate by a predetermined angle, the steps of S101 to S104 described above are repeated. During operation of the blow molding apparatus 20, four sets of containers 10 having a time difference of one step are manufactured in parallel.

Hereinafter, functions and effects of the present embodiment will be described.

The temperature adjusting unit 22 of the blow molding apparatus 20 reduces uneven temperature of the preform (for example, the intermediate molded body 41) in the temperature-adjusted cavity mold 31 (S102*a*). Thereafter, the drive cylinder 36 is driven to move the cavity mold 31 by a predetermined amount in the axial direction with respect to the intermediate molded body 41, and then the cavity mold is stopped (S102*b*). Thus, the air ejection part 37 disposed on the upper surface side of the cavity mold 31 faces the portion of the intermediate molded body 41 to be cooled. Then, air is ejected from the air ejection part 37 to locally cool the portion to be cooled of the intermediate molded body 41 positioned in the axial direction (S102*c*).

According to the present embodiment, the piston rod 36*a* (or the lifting and lowering device) of the drive cylinder 36 is positioned by the rod fixing mechanism (or the position fixing mechanism of the lifting and lowering device), whereby the air ejection part 37 is positioned in the axial direction at the portion of the intermediate molded body 41 to be cooled. Thus, it is possible to locally cool the portion of the intermediate molded body 41 to be cooled by ejecting air. Since the drive cylinder 36 or the lifting and lowering mechanism moves the movable table 34 or the cavity mold 31 in the axial direction of the preform, it is possible to intuitively align the air ejection part 37 in the axial direction, and it is easy to improve positional accuracy of a portion of the intermediate molded body 41 (preform 40) locally cooled in the axial direction. Therefore, a worker can easily perform work of adjusting the driving amount of the drive cylinder 36 so that the air ejection part 37 faces the position where the preform 40 is locally cooled. Furthermore, by stopping and positioning the drive cylinder 36, a desired position of the preform can be cooled to a pinpoint.

In addition, in the present embodiment, since the device for local cooling of the preform provided outside the cavity mold 31 is space-saving, the bottom portion of the preform can be locally cooled without any problem even when a gate cutting device or the like is disposed in the vicinity of the cavity mold 31 of the temperature adjusting unit.

Furthermore, in the present embodiment, since the position of the air ejection part 37 can be adjusted in the circumferential direction along the groove 32*a* formed in the upper support plate 32, it is also easy to accurately adjust the portion of the preform to be locally cooled in the circumferential direction.

The present invention is not limited to the above embodiment, and various improvements and design changes may be made without departing from the gist of the present invention.

In the above embodiment, the example in which the vicinity of the bottom portion of the preform is locally cooled by air has been described, but the portion where the preform is locally cooled by the temperature adjusting unit 22 is not limited to the above. For example, in a case where a container with a handle is manufactured, air may be blown to a portion corresponding to a root portion of the handle in an axial direction of the preform to locally cool the portion.

In the above embodiment, after the preliminary blow for shaping the preform 40 into the intermediate molded body 41, cooling blow for cooling the intermediate molded body 41 may be performed. When the cooling blow is performed by the temperature adjusting unit 22, the intermediate molded body 41 in a high-temperature state is rapidly cooled, so that whitening (cloudiness) due to spherulite formation crystallization that may occur when the intermediate molded body is slowly cooled can be more easily suppressed.

In the above embodiment, the configuration example in which the temperature adjusting unit 22 performs the preliminary blow has been described, but the temperature adjusting unit 22 may apply a heating pot mold as the cavity mold 31 without performing the preliminary blow. The temperature of the heating pot mold is adjusted by, for example, a heating member (not illustrated) such as a band heater (ring-shaped heater) or a rod-shaped heater, and the preform is heated from the outer peripheral side by heat from the heating pot mold without being in contact with the heating pot mold to adjust the temperature (S102*a* in the case of not performing preliminary blowing: first step). In addition, in a case where the preliminary blowing is not performed, a mold member for temperature adjustment inserted into the inside of the preform, for example, a temperature adjusting rod (member that directly contacts an inner peripheral surface of the preform to adjust the temperature: not illustrated) or a heating rod (member that does not contact the inner peripheral surface of the preform to adjust the temperature by radiation heating) may be applied instead of the core member that ejects the air. Further, the lower support plate 33 may be omitted in the cavity mold 31 in which the preliminary blow is not performed. In this case, the upper support plate 32 and the movable table 34 (or the spacer 34*a*) may be connected by a plurality of support pillars (not illustrated) to be integrated, and the upper cavity mold (the first mold 31*a*) and the lower cavity mold (the first mold 31*b* or the like) may be stacked therebetween to constitute the cavity mold 31.

In addition, the embodiments disclosed herein are to be considered in all respects as illustrative and not restrictive. The scope of the present invention is indicated not by the above description but by the claims, and it is intended that meanings equivalent to the claims and all modifications within the scope are included.

The invention claimed is:

1. A method for manufacturing a resin container, the method comprising:

A: accommodating an injection-molded bottomed resin preform in a temperature-adjusted mold and adjusting a temperature of the preform by the mold;

B: moving the mold by a predetermined amount in an axial direction with respect to the preform by a lifting and lowering device and then stopping the mold, and causing an air ejector arranged on an upper surface side of the mold to face a portion of the preform to be cooled;

C: ejecting air from the air ejector to locally cool the portion to be cooled of the preform positioned in the axial direction; and blow molding the preform whose temperature has been adjusted through A-C and manufacturing a resin container.

2. The method for manufacturing the resin container according to claim 1, wherein a plurality of the air ejectors is disposed in a circumferential direction of the preform.

3. The method for manufacturing the resin container according to claim 1, wherein the air ejector is disposed on a plate having an arc-shaped groove along a circumference centered on the preform, and is capable of adjusting a circumferential position with respect to the preform along the groove.

4. The method for manufacturing the resin container according to claim 1, further comprising:

injection molding the preform, wherein

A: adjusting a temperature of the preform by the mold and C: locally cooling the preform are performed on the preform containing residual heat from injection molding between the injection molding and the blow molding.

5. The method for manufacturing the resin container according to claim 1, wherein the resin container is a stackable container that is capable of being stacked on another container in a state where a bottom portion of the container is in contact with a shoulder portion of the another container.

6. An apparatus for manufacturing a resin container that adjusts a temperature of an injection-molded bottomed resin preform before blow molding, the apparatus comprising:

at least a temperature adjusting unit configured to adjusts a temperature of the preform and a blow molding unit configured to blow-mold the preform whose temperature has been adjusted, wherein the temperature adjusting unit includes a lifting and lowering device configured to drives a mold for accommodating the preform in an axial direction, and an air ejector attached to a plate disposed on an upper surface side of the mold, the plate has an arc-shaped groove along a circumference centered on the preform, and the air ejector is capable of adjusting a circumferential position with respect to the preform along the groove.

* * * * *